UNITED STATES PATENT OFFICE.

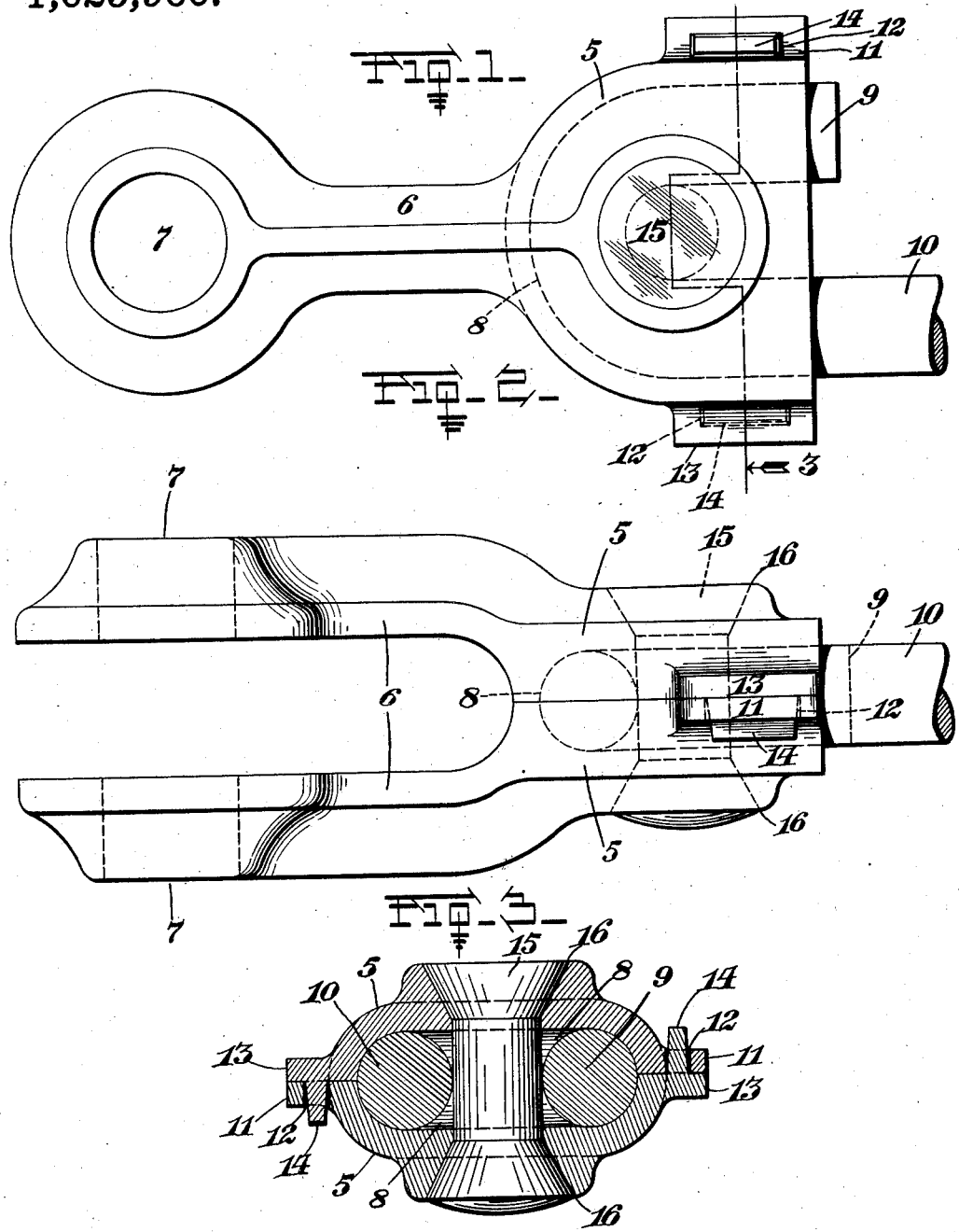

STERLING H. CAMPBELL, OF ST. LOUIS, MISSOURI.

BRAKE-ROD JAW.

1,025,960.  Specification of Letters Patent.  Patented May 14, 1912.

Application filed January 6, 1912. Serial No. 669,893.

*To all whom it may concern:*

Be it known that I, STERLING H. CAMPBELL, a citizen of the United States, residing at St. Louis, Missouri, have invented a certain new and useful Brake-Rod Jaw, of which the following is such a full, clear, and exact description as will enable any one skilled in the art to which it appertains to make and use the same, reference being had to the accompanying drawings, forming a part of this specification.

My invention relates to a brake rod jaw, such as is used in securing the brake rod of a railway car to the brake lever.

One object of my invention is to construct a brake rod jaw which will be simple and durable and of such form that it may be manufactured by drop forging.

Another object of my invention is to provide a brake rod jaw in which the loop of the brake rod will fit snugly into the pocket of the jaw.

In the accompanying drawings, which illustrate one form of a brake rod jaw made in accordance with my invention, Figure 1 is a top plan view; Fig. 2 is a side view, and Fig. 3 is a section taken on the broken line 3 of Fig. 1.

Like marks of reference indicate similar parts in the several views of the drawings.

The shank of the brake jaw is formed of two members 5, each of which carries an arm 6 having an opening 7 for the passage of a pin for securing the jaw to the brake lever. The two parts thus of course form a fork such as is used in brake rod jaws. Each of the parts 5 composing the shank of the brake rod jaw has formed therein a recess 8, the two recesses together forming a pocket for the loop 9 formed on the end of a brake rod 10. In order to temporarily secure the two parts 5 of the shank together, I form on each of said parts 5 a lug 11 having formed therein an opening 12. Each of the parts 5 is also provided with a lug 13 provided with a projecting rivet member 14 adapted to pass through the opening 12 in the lug 11 of the opposite member 5. After the two members 5 have been assembled as shown in Fig. 3, the members 14 may be riveted to temporarily secure the two parts 5 in position to form a complete brake jaw. After this has been done, the loop 9 of the rod 10 is inserted in the pocket formed by the two recesses 8 and a rivet 15 is passed through opening 16 formed in the shank 5 and through the center of the loop 9 and riveted in position. This will firmly hold the two parts of the jaw together and also firmly hold the loop 9 in its pocket.

I find that by my construction I may not only make the brake jaw of stronger material, but also make the pocket 8 fit the loop 9 more accurately than is possible where the brake jaw is cast, and consequently the walls of the pocket form a friction contact with the loop of the rod so that the loop is not liable to be pulled out by excessive strain as is likely to occur with the ordinary cast brake jaws.

I claim:

1. The combination with a brake rod provided with a loop, of a brake jaw having a pocket in its shank, said pocket being adapted to receive and snugly fit the loop of said brake rod, said pocket being open at the rear whereby the loop of the brake rod may be inserted longitudinally and fastening means passing through the shank of said jaw and the loop of said rod.

2. The combination with a brake rod provided with a loop, of a brake jaw having a pocket in its shank, said pocket being adapted to receive and snugly fit the loop of said brake rod, said pocket being open at the rear whereby the loop of the brake rod may be inserted longitudinally and a rivet passing through the shank of said jaw and the loop of said rod.

3. In a brake rod jaw the combination with a two-part shank provided with a pocket adapted to receive the loop of a brake rod, of auxiliary means for fastening the two parts of the jaw together before the brake rod is inserted, and means passing through both parts of the shank and the loop of the rod for fastening the parts of the shank permanently together and securing the rod in the pocket.

4. In a brake rod jaw the combination with a shank composed of two similar parts. each of said parts carrying one member of the fork for embracing the brake lever, of auxiliary means for securing the parts of said shank together to form a pocket for the loop of the brake rod, and a rivet passing through both parts of said shank and the loop of the brake rod to permanently secure the parts of the shank to each other and to secure the brake rod in position.

5. In a brake rod jaw the combination with a shank composed of two similar parts, of a lug carried by each of said parts and provided with an opening, a second lug carried by each of said members and provided with a riveting projection adapted to enter the opening in the first mentioned lug on the other part, said lugs forming means for securing the two members of the shank together to form a pocket to receive the loop of a brake rod, and a rivet adapted to pass through both parts of said shank and the loop of the brake rod to permanently secure said parts together.

6. In a brake rod jaw the combination with a shank composed of two similar parts, each of said parts carrying a member forming one part of a fork for embracing the brake lever, of a lug carried by each of said members and provided with an opening, a second lug carried by each of said members and provided with a riveting projection adapted to enter the opening in the first named lug on the other part, such lugs forming auxiliary means for securing the two parts of the shank together to form a pocket to receive the loop of a brake rod, and a rivet adapted to pass through both parts of the shank and the loop of the brake rod to permanently secure said parts together.

In testimony whereof, I have hereunto set my hand and affixed my seal in the presence of the two subscribing witnesses.

STERLING H. CAMPBELL. [L. S.]

Witnesses:
W. A. ALEXANDER,
B. L. CHADWELL.

---

Copies of this patent may be obtained for five cents each, by addressing the "Commissioner of Patents, Washington, D. C."